May 22, 1962
J. F. WILSON
3,035,899
PROCESS FOR THE PRODUCTION OF GRANULAR
CARBON-CONTAINING AMMONIUM SULFATE
Filed April 20, 1959
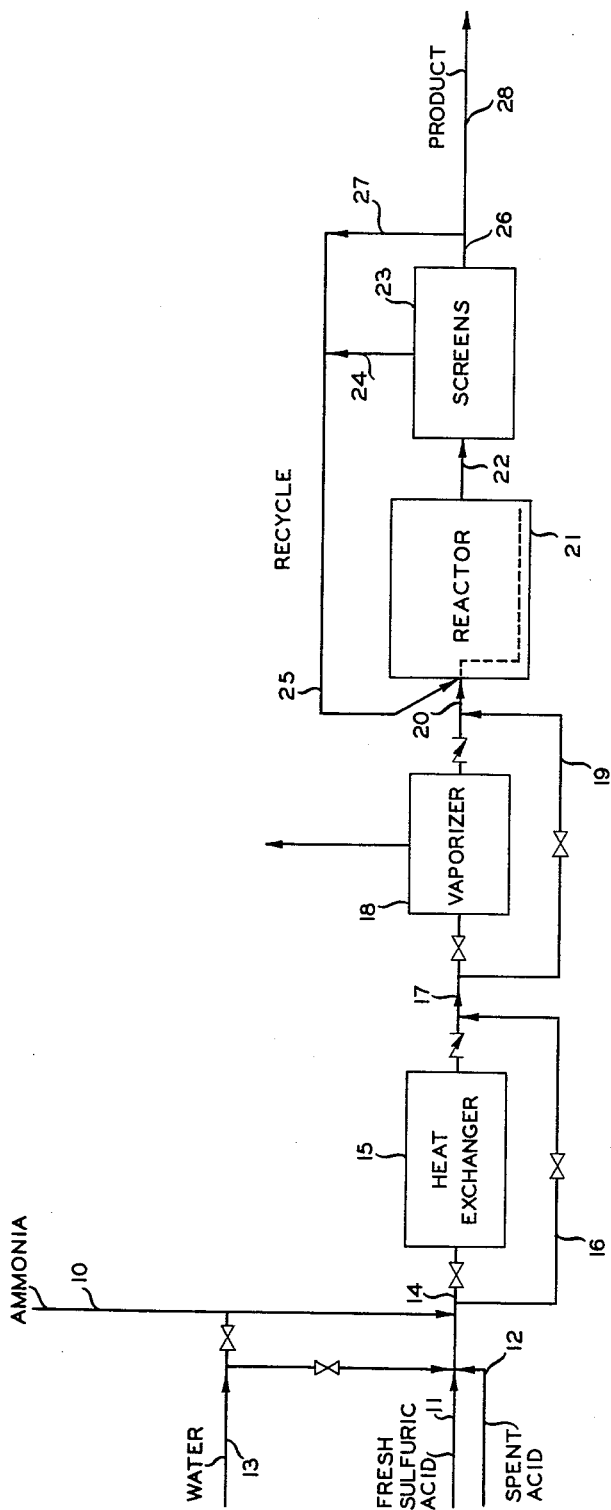
INVENTOR.
J. F. WILSON
BY
Hudson & Young
ATTORNEYS

United States Patent Office 3,035,899
Patented May 22, 1962

3,035,899
PROCESS FOR THE PRODUCTION OF GRANULAR CARBON-CONTAINING AMMONIUM SULFATE
Joseph F. Wilson, Bartlesville, Okla., assignor to Phillips Petroleum Company, a corporation of Delaware
Filed Apr. 20, 1959, Ser. No. 807,455
8 Claims. (Cl. 23—119)

This invention relates to a new and improved continuous process for the production of granulated ammonium sulfate. In accordance with one aspect, this invention relates to a process for the production of granulated ammonium sulfate from used sulfuric acid such as spent sulfuric alkylation acid. In accordance with another aspect, this invention relates to a process for the production of granulated ammonium sulfate utilizing, as one of the reactants, a mixture of fresh sulfuric acid and spent sulfuric acid derived from the acid treatment of petroleum hydrocarbons. In accordance with still another aspect, a process for producing granulated ammonium sulfate is provided wherein a slurry of ammonium sulfate in aqueous ammonium sulfate solution is contacted with recycle granulated ammonium sulfate in a heated rotating contacting zone to produce a dry granulated ammonium sulfate product.

The use of various nitrogen-containing fertilizers is well known and widespread in the field of agriculture. Various ammonium phosphates, ammonium nitrates, ammonium sulfates and mixtures of these materials, as well as with urea, are sold in tonnage quantities for soil fertilization. One of these fertilizers, in particular ammonium sulfate, is produced by a variety of processes. For many years, the major portion of the ammonium sulfate output came as a by-product of the steel industry, wherein ammonia from coke ovens was neutralized with sulfuric acid which had been previously used in the steel pickling vats. Since the synthesis of ammonia from natural gas and air has become one of the major sources of nitrogen for use in the preparation of nitrogen-containing fertilizers, many of these ammonia plants contain ammonium sulfate units as part of their standard production line.

In the usual ammonium sulfate plant, top-grade sulfuric acid is reacted with aqua ammonia to product a relatively clean ammonium sulfate product. Normally, the ammonium sulfate from such a unit is in the form of crystals which are recovered by evaporating the water from the reaction mixture resulting from the neutralization of ammonia with sulfuric acid. Since both of the reactants are fairly pure products, the price of the ammonium sulfate produced usually remains fairly high because of its purity. Actually, however, the purity of ammonium sulfate does not necessarily need to be so high when such material is to be used as a soil fertilizer. Therefore, it can be seen that there is a distinct need in the fertilizer industry for an economical continuous process for the production of granulated ammonium sulfate which is derived from an inexpensive reactant or reactants, such as waste materials, for example.

Accordingly, an object of this invention is to provide a new and improved economical continuous process for the production of granulated ammonium sulfate.

Another object of this invention is to provide an economic continuous process for the production of granulated ammonium sulfate from waste acid, such as spent sulfuric alkylation acid.

Still another object of this invention is to provide an improved economical continuous process for the production of granulated ammonium sulfate wherein the heat necessary to drive off the water to produce a dry granulated product is supplied by the heat of reaction of the reactants employed in the process.

Other aspects, objects and the several advantages of this invention are apparent from a study of this disclosure, the drawing and the appended claims.

In accordance with the present invention, I have found that high percentage of an on size granulated ammonium sulfate product having from about 0.1 to about 1.0 weight percent carbon in said product can be economically prepared in a highly desirable granulated form by a continuous process which comprises reacting a sulfuric acid of a finite carbon content, preferably a mixture of a fresh or pure sulfuric acid and spent sulfuric acid, such as spent sulfuric acid derived from the acid treatment of petroleum hydrocarbons, with ammonia either in the form of anhydrous ammonia or ammonium hydroxide, to produce a slurry of ammonium sulfate in an aqueous ammonium sulfate solution, passing said slurry to a heated rotating contacting zone and contacting therein said slurry with recycle granulated ammonium sulfate to form dry granulated ammonium sulfate, and recovering said granulated ammonium sulfate as a product of the process.

In accordance with a specific embodiment of the present invention, I provide an improved economical continuous process for the production of a high percentage of an on size granulated ammonium sulfate product having from about 0.1 to about 1.0 weight percent carbon, preferably from about 0.25 to about 0.75 weight percent carbon, in said product comprising reacting about 50/50 weight percent mixture of a fresh or pure sulfuric acid and spent sulfuric acid which has been previously utilized in the alkylation of olefins with isoparaffins, said acid mixture containing from about 0.135 to about 1.35 weight percent carbon, preferably from about 0.34 to about 1.0 weight percent with ammonia, either in the form of anhydrous ammonia or ammonium hydroxide, by contacting said acid mixture and said ammonia in a turbulent zone to form a slurry of ammonium sulfate in aqueous ammonium sulfate solution, passing said slurry to a heated rotating contacting zone containing recycle granulated ammonium sulfate and preferably maintained within a temperature range between about 195–300° F. by the heat of reaction between the ammonia and the sulfuric acid mixture to form a dry granulated ammonium sulfate product, recovering said dry granulated ammonium sulfate product as a product of the process, and recycling a portion of said granulated product to said contacting zone.

The spent or waste sulfuric acid which can be employed in the process of the present invention to produce a high percentage of an ammonium sulfate on size product containing not more than 1.0 weight percent carbon can be a waste sulfuric acid, such as, for example, is produced or derived from the acid treatment of petroleum hydrocarbons. Preferably, I utilize a relatively impure sulfuric acid which has previously been used in the alkylation of olefins with isoparaffins. Several methods can be employed in which these impure acids are utilized to provide an ammonium sulfate containing not more than 1.0 weight percent carbon. Spent sulfuric acid containing from 0.135 to about 1.35 weight percent carbon, preferably from about 0.34 to about 1.0 weight percent carbon can be used alone without admixing this material with fresh sulfuric acid, said acid being employed in a process wherein the recycle ammonium sulfate to the reactor is the same type as is being produced. On the other hand, spent acids containing as high as 4 to 5 weight percent carbon can be employed in the present process so long as sufficient fresh acid is admixed with the acid to provide an acid charge having a carbon content falling within the aforementioned range. Similarly, pure ammonium sulfate which does not contain any carbon can be used with the waste acid in the production of a product of not more than 1.0 weight percent carbon. To illustrate such methods of operation, a waste sulfuric acid containing 4.0 weight percent carbon can be blended with sufficient pure acid to provide a mixed acid containing 1.2 weight percent carbon, this figure being within the aforementioned range. Similarly, this same waste acid can be blended with sufficient pure acid to provide a mixed acid containing 2.0 weight percent carbon, and this mixed acid can be used in the present process, provide that sufficient pure ammonium sulfate is added to the reactor to yield a product containing less than 1.0 weight percent carbon.

As noted above, the ammonia which is reacted with the sulfuric acid mixture of fresh and spent sulfuric acid can be either in the form of anhydrous ammonia or ammonium hydroxide. The sulfuric acids which can advantageously be employed in the practice of the present invention can contain up to as much as 40 weight percent water. However, it is preferred to utilize acids containing no more than 10 weight percent water. However, if aqua ammonia is employed, the water content of this ammonia solution can range as high as 60 weight percent.

Also, as noted previously, the reactants, that is, the ammonia and mixture of spent and fresh sulfuric acids, are reacted together in a turbulent zone, such as a mixing T, and thereafter the reaction mixture is discharged into a rotating contacting zone, for example, a rotating drum or reactor, which contains recycle granulated ammonium sulfate. The rotating drum preferably employed by the present invention is a TVA ammoniator such as is available in most prior art fertilizer plants. However, other rotating drums or devices, such as pug mills and the like, can be advantageously employed. The reaction mixture removed from the turbulent zone and passed into the rotating contacting zone comprises a slurry of solid ammonium sulfate in a saturated aqueous solution of ammonium sulfate and this mixture is preferably discharged through spargers mounted in the bottom of the rotating reactor such that the solid granulated ammonium sulfate present in the rotating reactor covers the spargers.

The temperature range ordinarily maintained within the rotating contacting reactor or drum can be within the range of between about 195–300° F., preferably between about 210–230° F. The amount of granulated ammonium sulfate recycle which is employed within the rotating drum or reactor is generally maintained within the range between about 1.5–4.0 parts by weight percent of ammonium sulfate being fed to the reactor in the slurry-solution mixture. A more preferred recycle range is from about 2:1 to 3:1 on the same basis.

As noted above, one of the advantageous features of the present invention is that the heat necessary to drive off the water in the rotating drum or reactor so as to produce a dry granulated ammonium sulfate product is supplied primarily in the form of the heat of reaction between the ammonia and the sulfuric acid mixture. All of the heat can be supplied in this manner, if so desired. The temperature maintained within the rotating drum or reactor can be conveniently regulated by controlling the water content of the acid mixture and the ammonia being reacted, and further control of the temperature can be obtained by regulating the rate of recycle of granulated ammonium sulfate to the reactor. However, in general, if a relatively clean spent acid is employed, that is, one with a small amount of organic material present, a lower recycle rate of granulated ammonium sulfate can be utilized.

The present invention will be illustrated further by reference to the drawing in which the single FIGURE represents a preferred mode of practicing the present invention. For purposes of clarity, pumps, certain valves, vents, and other auxiliary equipment have been omitted.

Referring now to the drawing, conduit 10 designates a charge line by way of which ammonia from a source not shown is introduced into the system. Conduit 11 similarly designates a charge line by way of which fresh sulfuric acid is introduced into the system from a source not shown. Conduit 12 designates a charge line by way of which a spent sulfuric acid derived from the alkylation of olefins with isoparaffins is introduced into the system from a source not shown. Valved conduit 13 is provided so that water can be admixed with ammonia or the sulfuric acid mixture prior to contacting the ammonia and sulfuric acid. Ammonia introduced by way of conduit 10 and a mixture of fresh sulfuric acid and spent sulfuric acid are contacted at 14, which is preferably a turbulent zone, such as a mixing T or the like, so that intimate contacting of the reactants can be obtained. The reaction mixture obtained in conduit 14 comprises a slurry of solid ammonium sulfate in a saturated aqueous solution of ammonium sulfate. The carbon content of the acid mixture reacted with ammonia at 14 ranges from 0.135 to 1.35 weight percent of the acid. The resulting ammonium sulfate will contain from 0.1 to 1.0 weight percent carbon depending upon the carbon content of the acid mixture.

The ammonium sulfate slurry obtained in conduit 14 can either be passed to heat exchanger 15 or passed through by-pass conduit 16. Heat exchanger 15 is ordinarily employed to furnish additional heat to the ammonium sulfate slurry if large amounts of water are introduced through conduit 13. When large amounts of water are utilized in the reaction mixture, the heat of reaction is not sufficient to later vaporize all of the water present in the mixture in the rotating contacting zone. Further, heat exchanger 15 can also be used as a cooler if insufficient water is supplied to the reaction mixture to maintain the temperature within the reactor at the desired level and, therefore, heat can be removed from the ammonium sulfate slurry by heat exchanger 15.

The ammonium sulfate slurry passed either through heat exchanger 15 or valved by-pass conduit 16 is conducted through conduit 17 either to vaporizer 18 or valved by-pass conduit 19. Vaporizer 18 is provided so that a portion of the water present in the reaction mixture can be flashed at this point in the process before passing the reaction mixture to the reactor. If large amounts of water are added to the reaction mixture or additional heat is added in heat exchanger 15, a portion of the water present in the reaction mixture can be vaporized before the liquid slurry is passed to the reactor.

The slurry of solid ammonium sulfate in aqueous solution of ammonium sulfate removed from vaporizer 18 and/or passed through valved conduit 19 is conducted through conduit 20 and discharged into reactor 21, preferably through perforated spargers mounted in the bottom of the rotating reactor such that a bed of finely-divided ammonium sulfate covers the sparged tubes. As previously pointed out, reactor 21 is a rotating drum or contactor, or other granulating apparatus, preferably a TVA ammoniator, such as is ordinarily utilized in fertilizer plants. Rotating reactor 21 can have a retaining ring so attached that the depth of the finely-divided granulated ammonium sulfate bed within the reactor can be maintained at any desired level. Within reactor 21 water remaining in the reaction mixture introduced by way of conduit 20 is driven off primarily by the heat supplied by the heat of reaction between the ammonia and the sulfuric acid mixture. Therefore, a dry granulated product is removed from reactor 21 by way of conduit 22. The dry granulated ammonium sulfate removed from the open end of rotating reactor 21 is passed through suitable screening devices 23 so as to separate out the desired size of product. Generally, the desired particle size will be within the range between —4 +20 mesh. Granulated ammonium sulfate particles smaller than this mesh size are recycled by way of conduits 24 and 25 or other suitable means, such as a conveyor belt, to reactor 21. Recycle means 24 and 25 may be any suitable installation for conducting the fine granulated ammonium sulfate particles to the reactor. On size granulated ammonium sulfate product, that is, material having particle sizes within the range of −4 +20 mesh, is removed from screen unit 23 by way of conduits 26 and 28 as a produce of the process. Since the recycle rate of granulated ammonium sulfate to the reactor can vary considerably depending upon the temperature of the reactor and the amount of water in the reaction mixture being conducted into the reactor, it is preferred to recycle some of the on size product removed from screen unit 23 by conduit 26 and this is done by recycling on size product through conveyor means 25 and 27 to reactor 21.

By operating in accordance with the process of the present invention, a high quality, granulated ammonium sulfate product having a carbon content not in excess of 1.0 weight percent is produced wherein 60 weight percent or more of the material discharged from the rotating reactor will be within the mesh size range of from −4 +20 mesh. One of the obvious advantages of the present invention is the utilization as one of the reactants of an inexpensive waste material rather than the more expensive fresh or other clean grades of sulfuric acid. Also, I have found that a higher percentage of on size product can be obtained by utilizing a spent acid or spent acid-fresh acid mixture having a very limited carbon content than by utilization of a pure sulfuric acid as one of the reactants, as illustrated by Example I.

The operability and the improved results obtained by the practice of the present invention are better illustrated by the specific example.

EXAMPLE I

A series of runs was made in which ammonium hydroxide and a fresh sulfuric acid, spent sulfuric acid, and a spent-fresh sulfuric acid mixture were reacted together continuously to form ammonium sulfate.

In these runs, the desired amounts of sulfuric acid and ammonium hydroxide were charged to pressure cylinders and pressured to 20 p.s.i.g. with nitrogen. The discharge from each of the cylinders passed through a rotameter and a valve and then were admixed together by attaching the $NH_4OH$ line to the side outlet of a ¼″ stainless steel T and the acid line to one end of the T. The common line then discharged through a slotted sparge tube which was mounted in the bottom of a one-gallon stainless steel drum which was mounted on a frame so as to be rotated at 78 r.p.m. by means of a motor and a gear reduction box.

The runs were carried out by charging the desired amount of 20–40 mesh Phillips commercial ammonium sulfate, preheating the drum to 200–220° F. while rotating, and then opening the acid and ammonium hydroxide valves to achieve the proper flow rates as indicated on the rotameters. After the desired operating time the rotating drum was stopped and the reactant valves were turned off. The product was then screened to determine the percent of on size product. The results of these runs are expressed as Table I which is set forth below. In these runs, both C.P. reagent grade and spent alkylation sulfuric acid were employed. The spent sulfuric acid utilized in these runs was a spent alkylation acid and contained 3.9 weight percent carbon. The recycle ammonium sulfate was a pure commercial ammonium sulfate and did not contain any measurable amount of carbon.

Table I

| Run No. | Type of Acid | Reactant Concentrations, Weight, Percent | | Recycle Ammonium Sulfate,[1] Type | Weight Ratio Recycle to Feed | Wt. Percent Product Made from Spent Acid | Size Distribution of Product, Wt. Percent | | | | | | On Size | Carbon Content of Ammonium Sulfate, Wt. Percent (Calc.) |
|---|---|---|---|---|---|---|---|---|---|---|---|---|---|---|
| | | Acid | Ammonia | | | | +4 | −4 +6 | −6 +12 | −12 +20 | −20 +40 | −40 | −4 +20 | |
| 1 | CP | 93 | 40 | Phillips | 2:1 | 0 | 0.1 | 2.0 | 3.2 | 54.6 | 39.3 | 0.8 | 59.8 | 0 |
| 2 | Spent Alkylation | 93 | 40 | do | 2:1 | 33 | 11.3 | 6.5 | 12.9 | 43.6 | 24.6 | 1.1 | 63.0 | 0.96 |
| 3 | 50/50—CP/Spent Alkylation Acid | 62.6 | 100 | do | 2:1 | 17 | 8.1 | 16.3 | 26.4 | 39.7 | 8.9 | 0.6 | 82.4 | 0.48 |
| 4 | Spent Alkylation | 62.6 | 100 | do | 3:1 | 25 | 16.2 | 13.3 | 24.9 | 28.6 | 15.0 | 2.0 | 66.8 | 0.72 |
| 5 | Alkylation | 93 | 40 | From Alkylation Acid.[2] | 2:1 | 100 | (3) | (3) | (3) | (3) | (3) | (3) | (3) | 2.9 |

[1] Recycle ammonium sulfate was 100% −20 to +40 mesh.
[2] This recycle made by passing product into an open pan, drying, screening and isolating the minus 20-plus 40 mesh product.
[3] Amorphous mass.

Referring to the results obtained in the above example, it will be noted that only 59.8 weight percent of the product was on size, that is, between −4 and +20 mesh when the carbon content of the product was 0 weight percent. In runs 2, 3 and 4, respective carbon contents of 0.96, 0.48 and 0.72 weight percent in the product gave percentages of on size product of 63.0, 82.4 and 66.8. All of these values are greater than the result obtained in run 1. In run 2, a spent acid of 3.9 weight percent carbon was employed, but sufficient pure ammonium sulfate was added to the reactor to bring the carbon content of the product down below 1.0 weight percent. In run 3, the carbon content of the product was lowered to 0.48 weight percent by blending the waste acid and a pure acid to provide an acid of 1.95 weight percent and thereafter adding sufficient pure ammonium sulfate to the reactor as recycle to yield a product of the desired carbon content. In run 4, sufficient pure ammonium sulfate was employed as recycle to provide a product of 0.72 weight percent carbon, even though acid of 3.9 weight percent carbon was employed alone. Run 5 is a control run, and it can be seen that a product of this high a carbon content is an amorphous mass as discharged from the reactor. In this run, pure ammonium sulfate was employed as recycle, but the amount employed was insufficient to lower the carbon content of the product to the desired range.

The above data clearly indicate the beneficial effect obtained by utilizing spent sulfuric acid to produce ammonium sulfate, and further indicate the advantages of using fresh acid and/or pure ammonium sulfate recycle to bring the carbon content into the desired range when waste acids of too high an initial content are employed in this process.

Reasonable variation and modification are possible within the scope of the foregoing disclosure, drawing and the claims to the invention, the essence of which is that a continuous economical process for preparing granulated ammonium sulfate is provided comprising reacting spent sulfuric acid or a mixture of a fresh sulfuric acid and a spent sulfuric acid, as described, derived from the acid treatment of petroleum hydrocarbons with ammonia to form a slurry of ammonium sulfate and aqueous ammonium sulfate solution, passing said slurry to a rotating contacting zone containing recycle granulated ammonium sulfate to form a dry ammonium sulfate product, and recovering from said contacting zone granulated ammonium sulfate as a product of the process.

I claim:

1. A continuous process for preparing a granular ammonium sulfate product containing carbon up to about 1 weight percent which comprises reacting sulfuric acid having from about 0.135 to about 1.35 weight percent carbon with ammonia to form a slurry of ammonium sulfate and aqueous ammonium sulfate solution, passing said slurry to a heated contacting zone containing recycled granulated ammonium sulfate containing carbon up to about 1 weight percent to form granulated ammonium sulfate, and recovering said granulated ammonium sulfate from said contacting zone as a product of the process.

2. A continuous process for preparing a granular ammonium sulfate product containing carbon up to about 1 weight percent which comprises reacting sulfuric acid having from about 0.135 to about 1.35 weight percent carbon with ammonia to form a slurry of ammonium sulfate and aqueous ammonium sulfate solution, passing said slurry to a heated contacting zone maintained at a temperature ranging from about 195° to about 300° F. containing recycled granulated ammonium sulfate containing carbon up to about 1 weight percent, said recycle being present in an amount ranging from 1.5 to about 4 parts by weight percent of ammonium sulfate passed to said contacting zone in said slurry, to form granulated ammonium sulfate, and recovering said granulated ammonium sulfate from said contacting zone as a product of the process.

3. Continuous process for preparing a granulated ammonium sulfate product containing from about 0.1 to about 1.0 weight percent carbon comprising reacting a mixture of spent and fresh sulfuric acid having a carbon content ranging from about 0.135 to about 1.35 weight percent with ammonia by intimately contacting same in a turbulent zone to form a slurry of ammonium sulfate in aqueous ammonium sulfate solution, passing said solution to a rotating contacting zone containing recycle granulated ammonium sulfate, removing from said rotating zone granulated ammonium sulfate having a carbon content ranging from about 0.1 to about 1.0 weight percent; recycling a portion of said carbon-containing granulated ammonium sulfate to said rotating zone, and recovering the remainder of said carbon-containing granulated ammonium sulfate as a product of the process.

4. A process according to claim 3 wherein said spent sulfuric acid is a waste sulfuric acid previously utilized for petroleum refining of hydrocarbons.

5. Process according to claim 3 wherein the temperature of said rotating contacting zone is maintained within the range of about 195 to about 300° F.

6. Process according to claim 3 wherein the amount of granulated ammonium sulfate recycled to said rotating contacting zone is within the range of between about 1.5 to about 4.0 parts by weight percent of ammonium sulfate being passed to said rotating zone in said slurry.

7. Continuous process for preparing a granulated ammonium sulfate product containing from about 0.1 to about 1.0 weight percent carbon comprising reacting about a 50/50 weight percent mixture of a fresh sulfuric acid and a spent sulfuric acid derived from the acid treatment of petroleum hydrocarbons, said acid mixture containing from about 0.135 to about 1.35 weight percent carbon, with ammonia by contacting same in a turbulent zone to form a slurry of ammonium sulfate in aqueous ammonium sulfate solution, passing said slurry to a rotating contacting zone maintained within the temperature range of about 195–300° F. and containing recycle granulated ammonium sulfate to form a dry granulated ammonium sulfate product, recovering said granulated ammonium sulfate from said rotating zone as a product of the process, and recycling granulated ammonium sulfate product to said zone in the range of between about 1.5 to about 4.0 parts by weight per part of ammonium sulfate being passed to said rotating zone in said slurry.

8. Process according to claim 7 wherein said spent acid is a spent sulfuric acid derived from the alkylation of olefins with isoparaffins.

References Cited in the file of this patent

UNITED STATES PATENTS

| 2,022,813 | Ruys et al. | Dec. 3, 1935 |
| 2,586,729 | Shmidl | Feb. 19, 1952 |
| 2,710,423 | Douglas | June 14, 1955 |